Patented Apr. 22, 1947

2,419,500

UNITED STATES PATENT OFFICE 2,419,500

PRODUCTION OF HALOGENATED COMPOUNDS

Walter H. Peterson and Kenneth D. Detling, Berkeley, Calif., assignors to Shell Development Company, San Francisco, Calif., a corporation of Delaware No Drawing. Application October 27, 1943, Serial No. 508,092

12 Claims. (Cl. 260—658)

This invention relates to the synthesis of compounds containing one or more halogen atoms and deals particularly with an improved method for converting halogenated compounds having a tertiary aliphatic halogenated carbon atom to other halogen compounds and with new saturated aliphatic halides obtainable thereby. The invention is especially concerned with the reaction of tertiary halides with unsaturated compounds in the presence of inorganic halide condensation catalysts.

It is known that primary alkyl halides may be reacted with condensation catalysts such as sodium to obtain higher boiling products. This Wurtz reaction is not applicable to tertiary halides, however, because these halides form olefins under the reaction conditions. In any case the only products obtained are hydrocarbons. Tertiary alkyl halides have been reacted with aromatic hydrocarbons in the presence of condensation catalysts but here again the products are hydrocarbons, hydrogen halide being formed in the reaction.

The present invention is based upon the discovery that saturated aliphatic tertiary halides may be reacted with olefinic compounds in the presence of inorganic halide condensation catalysts to produce a saturated product having the same halogen content as the starting materials used. Thus, from a saturated aliphatic tertiary monohalide and a mono-olefinic compound, for example, a saturated halide is obtained. The new process provides an economical method for producing novel reaction products containing a quarternary carbon atom once removed from a halogenated carbon atom which are otherwise difficult to obtain halides.

A wide variety of different saturated halides having a halogen atom attached to a tertiary aliphatic carbon atom may be used in the process. Among the simple tertiary alkyl halides which may be used are, for example, tertiary butyl chloride, tertiary amyl chloride, 2-chloro-2-methyl pentane, 3-chloro-3-methyl pentane, 2-chloro-2,3-dimethyl butane, etc. Higher homologues, such, for example, as 2-chloro-2,4,4-trimethyl pentane, have also been successfully used in the process. While tertiary chlorides are preferred because of their generally lower cost, the corresponding fluorides, bromides and iodides, when available, give equally good results in the process. Instead of open chain tertiary halides, cyclic compounds having a tertiary carbon atom may be used. Typical tertiary halides of this class are, for example, 1-chloro-1-methyl cyclohexane, 1-chloro-1,2-dimethyl cyclohexane, chlorisopropyl cyclohexane, etc., and the corresponding bromides and the like. The tertiary halide may contain a plurality of halogen atoms. Thus, instead of tertiary butyl chloride, 1,2-dichloro-2-methylpropane, 1,2,3-trichloro-2-methylpropane, 1,1,2-trichloro-2-methylpropane, 1,2-dichloro-2-chloromethylpropane, and more highly halogen substituted teritary butyl chlorides may be used. The other halogen atom or atoms of the polyhalogenated tertiary halides need not be the same as that attached to the tertiary carbon atom. Examples of such mixed halides are 1-bromo-2-chloro-2-methylpropane, 1-chloro-2,3-dibromo-2-methylbutane and the like which react in the present process in the same manner as the corresponding tertiary alkyl monohalide.

Unsaturated compounds which may be used in the process include, for example, olefins such as ethylene, propylene, alpha- and beta-butylenes, isobutylene, the amylenes, hexylenes and higher homologues, cyclo-olefins such as cyclopentene, cyclohexene, methylcyclohexenes, cyclohexyl ethylene, etc. and suitable substitution products of such olefins. Instead of mono-olefinic compounds, more highly unsaturated compounds such as the diolefins, for example, butadiene, the pentadienes including isoprene, cyclopentadiene and the like may be used although, especially where conjugated diolefinic compounds are employed, greater care must be taken to avoid undesirable side reactions such as polymerization. When mono-olefinic compounds are used, the main product or products will be saturated halides having the same number of halogen atoms as the the tertiary halide chosen for the reaction. Diolefinic starting materials combine with two mols of tertiary halide and give products containing the number of halogen atoms in the tertiary halide or halides added. The tertiary halide as well as the unsaturated compound may be used as the pure or substantially pure chemical individuals or in the form of mixtures of one or more such compounds with or without other components such as paraffins, hydrogen, etc., which may be inert or may react under conditions of operation chosen without interfering with the desired reaction. An especially advantageous source of starting materials for the process is petroleum products, particularly fractions or individual components from catalytic or non-catalytic cracking of petroleum hydrocarbons. Petroleum cracking fractions which contain substantial amounts of paraffins and olefins, for example, butane-butylene fractions comprising mainly normal and iso-butane and butenes, are desirable starting materials. Selective hydrohalogenation of the isobutylene content of such a fraction or mixture of tertiary butyl halide, butenes and butanes is obtained which can be used as feed for the present process. After reaction the unreacted paraffins are separated and fractionated to segregate the unreacted isobutane content, if any, which may then be halogenated to form additional tertiary butyl halide which may be added to the butane-butylene feed along with the simultaneously formed hydrogen halide which may be used for the hydrohalogenation of the isobutylene. In this way substantially complete utilization of the halogen may be efficiently achieved. By isomerization of the separated normal butane content and/or halogenation of the latter and isomerization of the resulting straight chain halides to produce tertiary halides, complete utilization of the hydrocarbon starting materials may likewise be obtained. This advantageous modification of the process of the invention is not limited to hydrocarbon fractions made up substantially of compounds of four carbon atoms per molecule but may be employed with higher boiling fractions such as pentane-amylene fractions, etc., or mixtures of wider boiling range, as cracked gasoline fractions and the like.

As catalysts for the reaction, inorganic halides are used. Metal halides, particularly Friedel-Crafts type catalysts, are especially advantageous but suitable hydrogen halides such as hydrogen fluoride may also be used. Aluminum chloride, aluminum bromide, ferric chloride, titanium tetrachloride and antimony trichloride have been found to be suitable. Less active catalysts such as stannous or stannic chloride, bismuth chloride, etc. may also be used. The catalysts may be used in solid form as lumps or granules, or finely divided powders, or may be deposited on supports or carriers which may be inert or may have an advantageous influence on the reaction. United States Patent 2,295,977, for example, describes a method suitable for the preparation of such supported catalysts. Catalysts in the liquid state offer many advantages in the process. Friedel-Crafts type catalysts such as the aluminum halides may be used in this form by converting them to organic complexes. Organic complexes of active metal halides and ketones such as described in United States Patent 2,085,535, or metal halide-alkyl halide complexes, such as may be prepared, for example, by refluxing the tertiary alkyl halide to be used in the reaction with the corresponding aluminum halides, may be used. Other suitable complex catalysts are those formed by the union of active metal halides with hydrocarbons, which may be either aliphatic or aromatic, or mixtures of hydrocarbons. The catalysts claimed in United States Patent 2,306,261, for example, may be used. Double salts of aluminum chloride such as are described in United States Patent 2,076,201 are also useful in the process. Complexes or sludges formed in the course of the reaction may, after addition of fresh metal halide, be used as the catalyst. When hydrogen fluoride is used as the catalyst, it is preferably employed in the form of the liquid anhydrous acid but concentrated solutions may also be used. While boron fluoride may be used as a gas, it is likewise preferable in liquid form.

With Friedel-Crafts type catalysts it may sometimes be advantageous to use a small amount of an activator such as the corresponding hydrogen halide. More often, however, no activator is necessary since the tertiary halide used in the reaction is capable of maintaining the desired activity of the catalyst.

It has been found most advantageous to use a stoichiometric excess of tertiary halide based on the unsaturated compound or compounds present in the reaction mixture. At least equal molecular amounts, and more preferably three to ten or more mols, of tertiary halide are fed to the reaction for each mol of mono-olefinic compound supplied. Still higher ratios are advantageous when polyolefinic compounds are to be reacted. Most preferably, a higher ratio of tertiary halide to unsaturated compound is maintained in the reaction mixture than is used in the feed. United States Patent 2,232,674 describes a convenient method of continuous reaction which may be used to achieve such desirable higher ratios when carrying out the reaction with catalysts and reactants in the liquid phase. By this procedure ratios of tertiary halide to unsaturated compounds of the order of 100–500 to 1 or higher may be economically maintained in the reaction mixture when using feed ratios of about 3–90 to 1. For batch reaction under liquid phase conditions when using liquid or suspended solid catalysts, the desired excess of tertiary halide to unsaturated compound may be achieved by intimately contacting an excess of the tertiary halide with the catalyst and then slowly introducing the unsaturated compound to be reacted therewith, most preferably together with an additional amount of the tertiary halide.

Countercurrent or concurrent contact of reactants with catalyst in suitable towers or other mixing devices are suitable methods for carrying out the process. Instead of operating with both reactants in the liquid phase, either or both may be in the gaseous state. Thus, for example, a normally gaseous olefin may be bubbled through a solution or suspension of aluminum chloride in the tertiary halide being reacted or the olefin may be passed up a packed tower down which the mixture of catalyst and tertiary halide flows. Alternatively, a gaseous mixture of the tertiary halide and unsaturated compound, with the former in substantial molecular excess, may be passed through tubes or other suitable reactors containing a Friedel-Crafts type catalyst. Intermittent operation with periodic replacement or regeneration of the catalyst may be used instead of continuous or batch procedures.

The temperature, pressure and space velocity which will be most desirable in a given case will depend upon the tertiary halide or halides and the unsaturated compound being reacted, the catalyst chosen, and the method of reaction adopted. As a general rule, it is desirable to carry out the reaction at as low a temperature as is consistent with economical conversions since side reactions often increase with the temperature. With aluminum chloride catalysts, whether used as such or in the form of organic complexes, it has been found that temperatures below 50° C. are preferable and more advantageously temperatures between about −20° C. and +20° C. are used for reactions in the liquid phase. Good results have been obtained with ferric chloride at about 0° C. and with antimony trichloride at about 10° C. to 30° C. Less active catalysts require higher temperatures but it is preferred in most cases to keep the temperature below about 100° C.

The amount of catalyst necessary varies with the particular inorganic halide chosen. Highly active catalysts such as aluminum chloride are effective when as little as about 0.01 mol is used per mol of unsaturated compound employed, although it is preferable to use somewhat larger amounts of the order of about 0.03 to 0.2 mol per mol of unsaturated compound. With less active catalysts such as antimony trichloride, for example, at least 0.3 and more advantageously 0.5 to 1.0 mol or more per mol of unsaturated compound is used in liquid phase operations. The catalyst may be repeatedly recycled to the reaction after separation of the product so that the actual consumption is quite low.

The following examples illustrate some of the methods by which the new reaction may be carried out when using olefins as the unsaturated compound and show the wide variety of alkyl halides which are obtained.

*Example I*

Propylene was added to a reactor provided with a stirrer and cooling coils charged with 554 grams of tertiary butyl chloride and 447 grams of antimony trichloride catalyst. 282 grams of propylene were added gradually over a period of 70 minutes reaction at 6° C. to 10° C. After completion of the propylene addition the reaction was continued for 1 hour 50 minutes, and the product was withdrawn, stabilized and analyzed. The stabilized product contained 71% of a monochloroheptane fraction containing 2-chloro-4,4-dimethylpentane. The remaining higher boiling material consisted of 18% of a decylchloride fraction and 9% of products of still higher boiling point.

*Example II*

Tertiary butyl chloride was reacted with ethylene in a high-speed one-liter mixer by adding the ethylene slowly over a period of 0.5 to 1.0 hour to a stirred mixture of the tertiary butyl chloride and a catalyst consisting of a tertiary butyl chloride-aluminum chloride complex prepared at 0° C. 355 grams of catalyst complex were obtained from 550 grams of tertiary butyl chloride and 125 grams of aluminum chloride.

Using 122 grams of the catalyst complex with 25 grams of added aluminum chloride, 509 grams of tertiary butyl chloride and 105 grams of ethylene, i. e. a mol ratio of tertiary butyl chloride to olefin of 1.5 to 1, 300 grams of reaction product were obtained in reaction at 0° C. to 10° C. This product was found to contain about 75% neopentylcarbinyl chloride.

*Example III*

Using the same procedure as in Example II, 650 grams of tertiary butyl chloride were reacted with 140 grams of ethylene at −2° C. to 5° C., using 50 grams of ferric chloride as catalyst. The yield of neopentylcarbinyl chloride in the product was about 75% to 80%. The same results may be obtained with titanium tetrachloride as the catalyst.

*Example IV*

The tertiary chloride, 2-chloro-2,4,4-trimethylpentane, was reacted with ethylene using the apparatus employed in Example II. As catalyst, 100 grams of tertiary butyl chloride-aluminum chloride complex, to which 25 grams of aluminum chloride had been added, was used. To a mixture of the catalyst with 595 grams of 2-chloro-2,4,4-trimethylpentane were added 74 grams of ethylene at 0° C. Distillation of the product showed that it contained, in addition to tertiary butyl chloride, 1-chloro-3,3,5,5-tetramethylhexane and, as a decomposition or other reaction product, 1-chloro-3,3-dimethylbutane.

*Example V*

Tertiary butyl chloride and butene-2 in a mol ratio of 0.715 to 1 were reacted at 9° C. in the presence of 0.9 part by weight of antimony trichloride per part of tertiary butyl chloride. The yield of monochloroctanes was 141% by weight based on the olefin used. These products consisted mainly of 2-chloro-3,4,4-trimethylpentane together with some chlorides of 2,3,4-trimethylpentane boiling at 158° C. to 160° C.

*Example VI*

Tertiary butyl bromide reacts with propylene in the presence of an aluminum bromide catalyst. At 0° C. with a mol ratio of tertiary butyl bromide to propylene of 3.0 to 1, the main product of the reaction is 2-bromo-4,4-dimethylpentane.

*Example VII*

Using cetene in place of propylene in the process of Example II results in the production of 4-chloro-2,2-dimethyloctadecane.

*Example VIII*

Antimony trichloride, 460 grams, and tertiary butyl chloride, 400 grams, were charged to a one-liter turbo mixer. During a period of 48 minutes 128 grams of isobutylene were run in while the temperature was maintained between 5° C. and 10° C. At the end of the reaction, the reaction mixture was washed with hydrochloric acid to remove dissolved antimony trichloride and then dried with potassium carbonate and distilled at atmospheric pressure to separate the excess tertiary butyl chloride. The product was then fractionated under reduced pressure. The stabilized product weighing 149 grams was found to contain 18% of an octyl chloride fraction which, on redistillation, gave a fraction boiling between 48° C. and 54° C. at 20 mm. pressure, having a refractive index, 20/D, of 1.42920, and 8% of dodecyl chlorides. The remaining products were mainly isobutylene polymers. The predominant octyl chloride product appears to be 2-chloro-2,4,4-trimethylpentane.

*Example IX*

Substituting isopropyl chloride for the tertiary butyl chloride used in Example V failed to give any reaction. When the temperature was raised to 100° C., reaction took place but the products were high boiling propylene polymers.

In other examples of the reaction, tertiary amyl chloride with trimethyl ethylene in the presence of antimony trichloride gives, as one of the reaction products, 2-chloro-2,3,4,4-tetramethylhexane, and 2-chloro-2,3-dimethylbutane with ethylene gives 1-chloro-3,3,4-trimethylpentane.

It will be seen from these typical examples that the process of the invention is capable of wide variation not only in regard to the tertiary halide and olefin which may be reacted but also with respect to the inorganic halide catalyst which may be employed and the method and conditions of reaction which may be used. The new process makes available valuable new aliphatic saturated halides which cannot be produced by previous methods. An especially advantageous group of such halides are those having a halogenated carbon atom linked to a quaternary carbon atom by a carbon atom having not more than one hydrogen atom attached thereto, i. e. those containing the characteristic structure

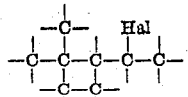

Monohalides of this type having a tertiary carbon atom linking the halogenated carbon atom with the quaternary carbon atom cannot be obtained from the corresponding paraffins by the usual halogenation methods because of the great tendency for substitution to take place at the tertiary carbon atom and for mixtures of halides to be produced. These mixtures are usually extremely difficult, if not impossible, to separate due to the small differences between the boiling points of the isomeric halides present therein. Addition of hydrogen chloride to the olefin does not give mono-chlorides of the type of the invention because such additions always lead to attachment of the chlorine at the more highly substituted carbon atom. Another reason why these methods cannot be used to prepare the new halides is that in most cases the corresponding paraffins and olefins are not known or available. In fact, it is one of the advantages of the new compounds that they can be used as an economical source of the corresponding paraffins having highly desirable anti-knock properties, especially under conditions of supercharged engine operation. Thus, for example, the 2-chloro-3,4,4-trimethylpentane, produced by the reaction of Example V, may be dehydrochlorinated and the resulting olefin may be hydrogenated to produce an aviation gasoline blending agent which is superior to iso-octane. The new halides also are of value as intermediates in the preparation of other valuable polar compounds. They may be converted, for example, to alcohols by hydrolysis in the presence of bases such as potassium hydroxide. The alcohols thus obtained may be used as such or may be converted into other types of derivatives such as ethers, esters, carboxylic compounds such as ketones, aldehydes and acids, etc. The esters, for example, may be produced directly from the halides, particularly the primary halides, by reacting with appropriate alkali metal salts of carboxylic acids. Thus, for example, acetates may be obtained by reacting the previously described primary chlorides with sodium acetate. Olefins are usually also formed in the reaction so it is preferred to first prepare the alcohol under as mild reaction conditions as are feasible and to separately esterify the alcohol obtained.

Aside from their use as intermediates in the preparation of valuable polar compounds of novel structure, the new halides have many other uses. They are solvents for a wide variety of organic materials and are especially suitable as solvents or thinners for lacquers and synthetic resin base enamels and varnishes, and the like. It will thus be seen that the process and products of the invention offer many advantages and are capable of wide application. The invention, accordingly, will be understood as not limited to the details cited by way of illustrating the novel higher saturated halides which may be produced and the valuable derivatives into which they may be converted nor by any theory proposed in explanation of the new results obtained.

We claim as our invention:

1. A process of producing 2-chloro-3,4,4-trimethylpentane which comprises intimately contacting tertiary butyl chloride and butene-2 in the liquid phase with a liquid organic complex derivative of aluminum chloride and tertiary butyl chloride containing added free aluminum chloride at about —20° C. to +20° C., separating aluminum chloride complex from the reaction products, adding fresh free aluminum chloride thereto, returning the resulting catalyst mixture to the reaction and recovering 2-chloro-3,4,4-trimethylpentane from the reaction products.

2. A process of producing an alkyl monochloride which comprises reacting tertiary butyl chloride with a mono-olefin in the liquid phase at about —20° C. to +20° C. in the presence of an aluminum chloride-containing liquid complex catalyst, separating aluminum chloride complex from the reacted mixture, adding fresh free aluminum chloride thereto, returning the resulting catalyst mixture to the reaction and recovering the alkyl monochloride produced.

3. A process of producing an alkyl monochloride which comprises reacting a tertiary alkyl monochloride with a mono-olefin in the liquid phase at about —20° C. to +20° C. in the presence of an aluminum chloride-containing liquid complex catalyst to effect addition of said tertiary alkyl monochloride to said olefin, separating aluminum chloride complex from the reacted mixture, adding fresh free aluminum chloride thereto, returning the resulting catalyst mixture to the reaction and recovering the alkyl monochloride produced.

4. A process of producing an alkyl monohalide which comprises reacting a tertiary alkyl monohalide with a mono-olefin in the liquid phase at about —20° C. to +20° C. in the presence of an aluminum chloride-containing liquid complex catalyst to form a monohalide having a number of carbon atoms equal to the sum of the number of carbon atoms per molecule in said tertiary halide and olefin, separating aluminum chloride complex from the reacted mixture, adding fresh free aluminum chloride thereto, returning the resulting catalyst mixture to the reaction and recovering the alkyl monohalide produced.

5. A process of producing an alkyl monohalide which comprises reacting a tertiary alkyl monohalide containing a halogen atom of the group consisting of chlorine atoms and bromine atoms with a mono-olefin in the liquid phase in the presence of a liquid complex catalyst containing a complex of the corresponding aluminum halide and said tertiary alkyl halide, separating said aluminum halide complex from the reacted mixture, adding the corresponding fresh aluminum halide thereto, returning the resulting catalyst mixture to the reaction and recovering the higher boiling alkyl monohalide produced.

6. A process of producing an alkyl monohalide which comprises reacting a tertiary alkyl monohalide with a mono-olefin in the liquid phase in the presence of a liquid organic complex of a Friedel-Crafts type metal halide catalyst, separating said liquid organic complex catalyst from the reacted mixture, adding fresh Friedel-Crafts type metal halide catalyst to the separated complex, returning the resulting catalyst mixture to the reaction and recovering the higher boiling alkyl monohalide produced.

7. A process of producing an alkyl monohalide which comprises reacting a tertiary alkyl monohalide containing a halogen atom of the group consisting of chlorine atoms and bromine atoms with a mono-olefin in the presence of a liquid complex of a Friedel-Crafts type catalyst formed in the reaction, separating said liquid complex from the reaction products, adding fresh Friedel-Crafts type catalyst to the separated complex, returning the resulting catalyst mixture to the reaction and recovering the higher boiling alkyl monohalide produced.

8. A process of producing an alkyl monochloride which comprises reacting tertiary butyl chloride with a mono-olefin in the presence of a liquid organic complex of aluminum chloride and tertiary butyl chloride, separating said complex from the reacted mixture, adding fresh free aluminum chloride thereto, returning the resulting catalyst mixture to the reaction and recovering the alkyl monochloride produced.

9. A process of producing an alkyl monohalide which comprises reacting a tertiary alkyl monohalide with a mono-olefin in the presence of a liquid complex of the corresponding aluminum halide and the tertiary alkyl halide used in the reaction containing added corresponding free aluminum halide.

10. A process of producing a saturated monohalide which comprises reacting a saturated monohalide having the halogen atom attached to a tertiary carbon atom with a mono-olefin in the presence of a liquid complex of a Friedel-Crafts type metal halide catalyst and an aromatic hydrocarbon containing an added amount of said metal halide.

11. A process of producing a saturated monochloride which comprises reacting a saturated monochloride of lower molecular weight having the chlorine atom attached to a tertiary carbon atom with a mono-olefin in the presence of a liquid organic complex of aluminum chloride and said saturated monochloride of lower molecular weight containing added free aluminum chloride.

12. A process of producing a saturated halide which comprises reacting a saturated halide of lower molecular weight having a halogen atom attached to a tertiary carbon atom with a mono-olefin in the presence of a liquid organic complex of a Friedel-Crafts type metal halide catalyst containing an added amount of said metal halide.

WALTER H. PETERSON.
KENNETH D. DETLING.

REFERENCES CITED

The following references are of record in the file of this patent:

UNITED STATES PATENTS

| Number | Name | Date |
|---|---|---|
| 2,068,772 | Sixt | Jan. 26, 1937 |
| 2,297,564 | Kirkbride | Sept. 29, 1942 |

FOREIGN PATENTS

| Number | Country | Date |
|---|---|---|
| 695,125 | French | Dec. 11, 1930 |
| 824,909 | French | Feb. 18, 1938 |
| 261,689 | German | July 2, 1913 |

OTHER REFERENCES

Simons et al., "J. Am. Chem. Soc.," vol. 60, pp. 2596–7, 1938. "Chemical Abstracts," vol. 28, col. 737, 1934, Abstract of article by Schurman et al., in "J. Am. Chem. Soc.," vol. 55, pp. 4930–5, 1933.

Ibid., vol. 33, col. 119, 1939, Abstract of article by Whitmore et al. in "J. Am. Chem. Soc.," vol. 60, pp. 2571–3, 1938.